UNITED STATES PATENT OFFICE.

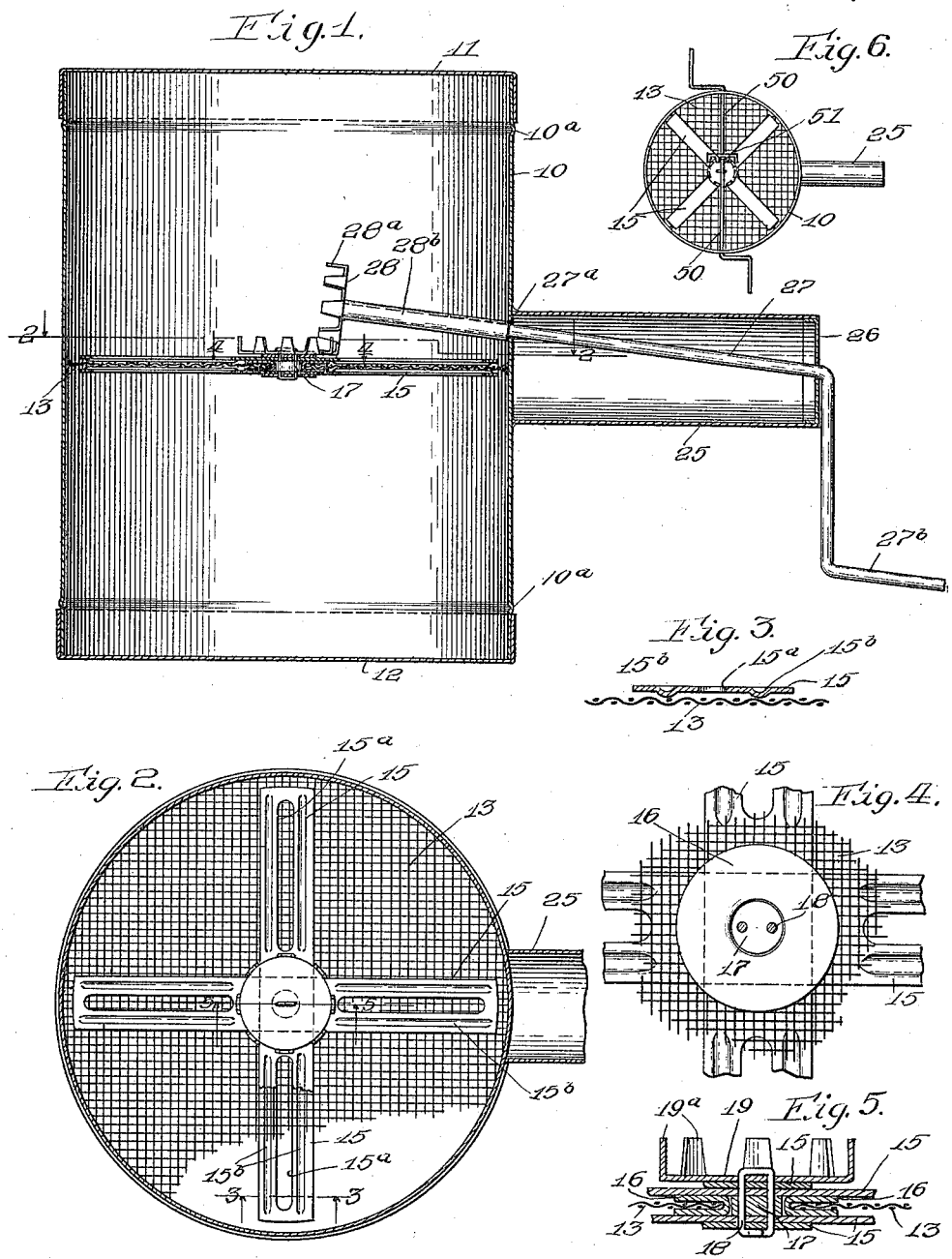

HERBERT B. SPERRY, OF CHICAGO, ILLINOIS.

FLOUR-SIFTER.

1,162,816.  Specification of Letters Patent.  Patented Dec. 7, 1915.

Application filed December 23, 1914. Serial No. 878,640.

*To all whom it may concern:*

Be it known that I, HERBERT B. SPERRY, a citizen of the United States, residing at Chicago, in the county of Cook and State of Illinois, have invented certain new and useful Improvements in Flour-Sifters, of which the following is a specification.

My invention relates to the common culinary implement known as a flour sifter, and particularly to a sifter adapted to successively sift the flour or other material a number of times so as to leaven or lighten the flour.

It is a common and well-settled practice in pastry and cake making and in other forms of cooking to pass the flour a number of times through a sieve in order to thoroughly separate the particles thereof, and to lighten the flour in order to improve the quality of the dough to be subsequently baked.

My invention has for its primary object to provide an improved form of sifter in which the successive siftings of the flour may be done without the removal of the flour from the sifter can by a simple reversal of the casing, and a continuous or nearly continuous operation of stirring mechanism.

A further object of the invention is to provide an improved construction of sifter in which the same may be reversed easily and quickly by the operator, and without the necessity of stoppage of the stirring mechanism.

A further object of the invention is to improve the construction of the stirring mechanism by which the same may be economically manufactured and assembled, and at the same time be more efficient to coöperate in stirring the flour or other material to be sifted adjacent a sifting screen.

A further object of the invention is to provide in a device of the described character an improved stirring device.

A still further object of the invention is to provide in a device of the described character improved means for operating the stirring mechanism.

Further objects of the invention will appear from the following description which refers to the drawings illustrating the preferred embodiment of the invention, and the invention is more particularly pointed out in the appended claims.

In the said drawing: Figure 1 is a sectional elevation view of my improved sifter showing the sifter casing and the manipulating handle thereof to disclose the details of the interior mechanism. Fig. 2 is a sectional view on line 2—2, Fig. 1. Fig. 3 is an enlarged sectional view illustrating a detail of the construction of one of the stirrer arms and the screen, being taken on line 3—3, Fig. 2. Fig. 4 is an enlarged broken detail view illustrating the mechanism for driving the stirrers. Fig. 5 is an enlarged detail sectional view being taken approximately on line 5—5, Fig. 2. Fig. 6 is a view showing a modified form of mechanism for driving the stirrers.

Throughout the drawings like letters of reference are used to indicate like parts, and the reference character 10 designates a cylindrical casing open at its extremities and provided with closure members or lids, 11, 12, which have peripheral flanges adapted to fit closely over the ends of the sieve to close it in the usual manner. The material of the can 10 may be beaded as indicated at $10^a$ for coöperating with the lid flanges in forming relatively tight joints. The interior of the cylindrical casing 10 is divided into a plurality of compartments by a screen member indicated by the reference character 13, which is secured to the interior walls of the casing 10, preferably midway between the extremities of the casing, thus dividing the casing into two equal compartments. The location of the dividing screen, however, is a matter that may be varied, if desired, although in a sifter of the type herein described, the compartments on each side of the screen may advantageously be of about equal capacity. The central screen 13 may be secured to the interior walls of the casing in any desired manner as by soldering, and will be formed generally of wire mesh, the wires thereof being of a degree of fineness and spaced apart so as to form a foraminous member well adapted to permit the passage of comminuted material, such as flour and the like, of the desired degree of fineness, therethrough. Preferably near the center of the screen 13 provision is made for anchoring a bearing for supporting the means carrying and imparting rotation to the stirrers. The stirrers are indicated generally by the reference character 15 and consist of thin sheet metal strips or bars as illustrated in the drawings. For the purpose of lightening the structure of the stirrers 15 they are provided with elongated slits of some width by cutting away the material, there being two of these slits in each of the stirrer bars spaced on opposite sides of the central portion thereof, as indicated by the reference character 15ª (see Figs. 2 and 3). For the purpose of strengthening the stirrer bars 15 the material in the body thereof on opposite sides of the slit 15ª is formed out of the plane of the main body presenting convexly protruding surfaces, as indicated at 15ᵇ. These convexly protruding surfaces 15ᵇ are arranged to contact with the surface of the screen 13, and because of their curving contour they will agitate the surface of the screen as they are passed over the mesh thereof and will greatly assist in causing the flour or other pulverized or comminuted material to be passed through the mesh of the screen. In making up the structure of each separate sifter four stirrer bars 15 are employed, as illustrated in Figs. 1, 2, 4 and 5, there being four of the stirrer bars used in each device; two on each side of the central screen or partition 13. These stirrer bars are arranged in pairs on opposite sides of the screen in the form of a Greek cross (see Figs. 2 and 4). These stirrer bars in the form shown may be manufactured very rapidly and cheaply from sheet metal. In order to attach them to their supporting and driving means each bar 15 is preferably provided with four perforations spaced around a point midway between the extremities thereof and midway between the longitudinal sides (see Figs. 2, 4 and 5).

The central screen 13 has a perforation near its center, and to form a support or bearing for the stirrer driving mechanism a reinforcing device in the form of a circular metallic washer, as indicated by the reference character 16 (Fig. 5) is inserted around the central opening in the screen. The washer 16 is preferably formed of sheet metal and provides a reinforced central opening adapted to take a perforated journal block or bearing block, indicated by the reference character 17 (Figs. 1, 4 and 5). When two pairs of stirrer bars 15 are arranged in the form of a Greek cross on each side of the screen 13 and the journal block 17 is supported in the reinforced part 16 thereof, these parts are in condition to be secured together for synchronous rotation. It will be noted that the journal block 17 is of a thickness sufficient to act as a spreader between the pairs of stirrers on opposite sides of the screen and prevents their binding upon the central bearing member or washer 16 which reinforces the screen. A permanent connection between the central bearing block 17 and the stirrers is made by passing one or more loops of wire or other suitable material, as indicated at 18, through registering openings in bearing block 17 and in the stirrers. The bearing block 17 is preferably provided with two perforations located on opposite sides of the central axis thereof that the flexible metallic ties 18 may be used to bind the parts together, as illustrated in detail in Fig. 5. Before the tie 18 is passed through the parts a gear 19 having upstanding teeth 19ª is placed upon one pair of the stirrers 15, there being openings also formed in the body of the same to register with the corresponding openings in the stirrers and in the central bearing block. It is necessary that only two perforations should be formed in the central bearing block and in the gear wheel A, but it is desirable that the stirrers be provided each with the four openings. Ordinarily one member 18 is sufficient to secure the parts together but the two pairs of spaced perforations in the stirrers are made desirable for manufacturing purpose and for ease in assembling, enabling the operator to put the stirrer members in the form of a Greek cross for passing the tie therethrough without any relation to specific arrangement, thus it will be seen that when a pair of stirrers is arranged in the form of a Greek cross with the four central perforations arranged around the center thereof there will always be registering openings which will also be in register with the single pair of perforations in the central bearing block 17 thus insuring speed in assembling. The tie member 18 is preferably in the form of a good grade of wire, the metal therein admitting of having the ends twisted together for the purpose of securing and binding the parts together in a rotatable condition.

The can 10 of the sifter is provided with a handle 25 of tubular sheet metal preferably secured to the exterior wall of the can with its axis in the plane of the screen on the interior of the can. The outer extremity of the handle 25 is closed with the perforated metallic member 26, the perforation therein being adapted to take the shaft 27 which carries a beveled gear 28 at its inner extremity on the interior of the can, the teeth on this gear being indicated by the reference character 28ª and being in mesh with the gear teeth 19ª. The shaft 27 passes through an opening in the can wall forming a suitable bearing for one end of the shaft, as indicated at 27ª. The gear 28 may be secured to the shaft 27 by means of a sleeve 28ᵇ secured to it and telescoping over the extremity of the shaft 27 on the interior of the can. The outer extremity of the shaft 27 protruding through the closure plate 26 of the handle is arranged in the form of a crank, as indicated at 27ᵇ.

The operation of my improved sifter is as follows: One end of the sifter being closed by one of the closure members 11, 12, the sifter may be filled with material to be sifted by removing the cover at the opposite extremity. When the capacity of the sifter has been reached in the filling operation, that is, when the space between the screen and the uncovered end of the sifter can is filled the cover may be replaced upon the can and the stirring mechanism operated by turning the crank 27ᵇ. This will obviously result in the synchronous rotation of the two pairs of stirrer members on opposite sides of the central screen 13 and the corrugated portions 15ᵇ of the stirrers will engage the surface of the screen 13 and tend to expedite the passage, through the screen, of the material to be sifted both by crowding particles of material through the openings in the screen and by causing the particles to pass through the openings by reason of vibrations imparted to the screen as the stirrers are rotated over the surfaces thereof. Obviously, this manipulation of the stirring device of the sifter may be continued until the pulverized or comminuted material being sifted shall have passed into the lower compartment below the screen. The sifter, however, when in operation being closed at both ends obviously the sifted material will not pass from the can, and when all of the material has passed into the compartment below the screen the operator may repeat such an operation by rotating the handle 25 which is grasped in his hand, giving the same a 180 degree turn which will place the compartment in the sifter containing the material on the upper side of the screen reversing the compartments therein, and this reversal will put the sifter in condition for further operation, allowing the sifted material passing again through the screen in the reverse direction to fall by gravity into the original compartment. Obviously this sifting operation may be repeated as many times as the operator desires by slightly loosing his hold of the cranked handle 27ᵇ, merely allowing the handle to rotate each time in a 180 degree shift, thus considerably reducing the amount of labor required in sifting material a plurality of times, there being a considerable saving both in speed and labor over the old method of allowing material to drop from the sifter can into a receiving vessel upon each separate sifting operation. Furthermore, the construction of my improved sifter by which the operating crank is journaled in the handle enables the operator to reverse the device without releasing hold on the handle or without releasing his hold upon the operating crank.

In Fig. 6 is a modified form of mechanism for driving the stirrers. A shaft indicated by the reference character 50 is journaled in the side walls of the can passing therethrough and being provided with crank portions on its extremities on the exterior of the can. This construction permits of having an operating crank on each side of the can so that the device can be readily operated by a right-handed or left-handed person. The chief advantage of this construction, however, resides in the fact that when the operator reverses the can there will always be an operating crank on the shaft 50 in position to be engaged by the free hand of the operator. The shaft 50 is provided with a gear wheel 51 engaging the gear operating the stirrers, this gear and the stirrer driving mechanism being preferably of the form as shown in the other drawings.

In order that the invention might be understood, the details of the preferred embodiment have been particularly pointed out, but it is not desired to be limited to the details of the structure thus shown and described, for it is apparent that persons skilled in the art may resort to various modifications without departing from the purpose and spirit of the invention.

I claim:—

1. A sifter comprising a casing, a transverse centrally disposed screening partition therein, closures at opposite ends of said casing, stirrers located at opposite sides of said screening partition, means independent of said closures for securing said stirrers together and permitting rotation of said stirrers in unison whereby said closures may be freely removed from said casing without interfering with the normal operation of the stirrers, and means for imparting rotation to said stirrers, said means being operable from the exterior of the casing.

2. A sifter comprising a casing, a transverse, centrally-disposed screening-partition, removable closures at opposite ends of said casing, stirrers located at opposite sides of said screen and coöperating therewith, means extending through an opening in said screen for rotatably supporting said stirrers, a hollow handle secured to said casing adjacent said screen and projecting from the outer periphery of the casing, a cranked shaft journaled in the walls of the casing and extending through the hollow interior of the handle, and means for imparting rotation from said handle to said stirrers.

3. The combination in a sifter of a casing, a transverse centrally-disposed screening-partition, removable closure members at opposite ends of said casing, stirrers located at opposite sides of said screen and coöperating therewith, means for rotatably securing said stirrers together said means being journaled in an opening in said screen and supported therein independently of the closure members of said casing, and means operable from the exterior of the casing and independently of said closure members for imparting sychronous rotation to said stirrers.

4. The combination in a sifter, of a casing, a transverse centrally-disposed screening-partition supported by said casing, removable closures at opposite ends of said casing, stirrers located at opposite sides of said screen and coöperating therewith, means extending through an opening in said screen and relatively supported thereby for operatively connecting said stirrers to rotate together in unison, and a bearing for said stirrer connecting means being secured in and independently supported by said screen, whereby said closures may be freely removed at will from the casing without interfering with the normal operation of the stirrers.

5. A sifter comprising in combination a casing, a transverse centrally-disposed screening-partition secured to said casing, removable closures at opposite ends of said casing, stirrers located at opposite sides of said screen, means for operatively connecting said stirrers to rotate together in unison said means having a bearing supported by said screen, a cranked shaft journaled in the walls of said casing with the cranked portion thereof on the exterior of the casing, and bevel gears secured to said cranked shaft and to said stirrers for imparting the movement of said cranked shaft to said stirrers.

6. A sifter comprising in combination a casing, a centrally-disposed screening-partition therein, stirrers located at opposite sides of said screen, there being an opening in said screen for assisting in the support of said stirrers, a metallic reinforcing means around the periphery of the opening in said screen, a perforated journal-block in the screen opening and metallic anchoring means extending through the perforations in said journal-block and through registering perforations in each of said stirrers.

7. In a sifter, the combination with a casing of a transverse centrally-disposed screening-partition, stirrers located at opposite sides of said screening-partition and coöperating therewith, there being upstanding corrugations formed in said stirrers on the sides thereof adjacent said screening-partition, said corrugations being adapted to coöperate with the opposite surfaces of said screening-partition, and means for imparting rotation to said stirrers from the exterior of the casing.

8. A sifter comprising in combination a casing, a screening-partition therein, stirrers located at opposite sides of said screening-partition and rotatably supported thereby, there being corrugations or upstanding portions extending longitudinally of said stirrers on the sides thereof adjacent the screening-partition and adapted to contact therewith, means for rotatably supporting said stirrers in said screening-partition, and means for imparting synchronous rotation to said stirrers from the exterior of the casing.

9. In a sifter comprising a casing, a transversely-disposed screening-partition, stirrers located at opposite sides of said screening partition, and comprising a plurality of corrugated metallic strips being perforated adjacent the central portions thereof, the corrugated portions therein having their convex or upstanding sides arranged in contact with the surfaces of the screening-partition to coöperate therewith, a bearing secured in said screen, a perforated bearing block supported by said bearing, and anchoring means adapted to pass through perforations in said stirrers and said bearing block for rotatably securing said stirrers together.

10. A sifter comprising in combination a casing, a transversely-disposed screening-partition, stirrers located at opposite sides of said screening-partition and comprising relatively thin metallic strips reinforced by corrugations or upstanding portions extending longitudinally thereof, said corrugations or upstanding portions having their convex portions arranged adjacent the surfaces of said screening-partition and in contact therewith, a bearing secured to said screening-partition, a bearing block therein, means for anchoring said stirrers to said bearing block and to each other and means for imparting synchronous rotation to said stirrers from the exterior of the casing.

11. A sifter comprising a casing, a transverse centrally-disposed screening-partition, removable closures at opposite ends of said casing, stirrers located at opposite sides of said screening-partition, means for securing said stirrers together for synchronous rotation, a hollow cylindrical handle secured to the wall of the casing adjacent the said screening-partition, a perforated closure member for the outer extremity of the hollow cylindrical handle, a shaft rotatably journaled at said perforation of the handle closure member and in a perforation in the wall of the casing on the interior of the cylindrical handle, and means for imparting rotation from said cranked shaft to said stirrers comprising a pair of gears one of which is secured to said cranked shaft and the other to said stirrers.

12. A sifter comprising, in combination, a casing, a screening partition therein, stirrers located at opposite sides of said screening partition and being rotatably supported thereby, there being spaced corrugations or upstanding portions with cut-away portions therebetween all extending longitudinally of said stirrers, the corrugations or upstanding portions protruding toward the screening partition on the sides thereof adjacent the same and being adapted to contact therewith, means for rotatably supporting said stirrers on said screening partition, and means for imparting synchronous rotation to said stirrers from the exterior of the casing.

13. In a sifter comprising a casing, a transversely disposed screening partition, stirrers located at opposite sides of said screening partitions and comprising a plurality of corrugated metallic strips with perforations adjacent the central portions thereof, the corrugated portions therein having their convex or upstanding sides arranged in contact with the surfaces of the screening partition to coöperate therewith, a bearing secured in said screen, a perforated bearing block supported by said bearing, and a flexible metallic anchoring device adapted to pass through registering perforations in said stirrers and said bearing block for rotatably securing said stirrers.

In testimony whereof I have signed my name to this specification, in the presence of two subscribing witnesses, on this 17th day of December A. D. 1914.

HERBERT B. SPERRY.

Witnesses:
ARTHUR L. SPRINKLE,
THOMAS COLSON.

Copies of this patent may be obtained for five cents each, by addressing the "Commissioner of Patents, Washington, D. C."